(12) United States Patent  
Antonsson

(10) Patent No.: US 7,760,130 B2  
(45) Date of Patent: Jul. 20, 2010

(54) METHOD AND SYSTEM FOR PRESENCE DETECTION

(75) Inventor: Anders Antonsson, Västra Frölunda (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/254,435

(22) Filed: Oct. 20, 2008

(65) Prior Publication Data

US 2009/0102697 A1 Apr. 23, 2009

(30) Foreign Application Priority Data

Oct. 19, 2007 (EP) .................................. 07118876

(51) Int. Cl.
*G01S 13/04* (2006.01)
*G01S 7/28* (2006.01)
*G01S 13/00* (2006.01)
*G01S 7/02* (2006.01)

(52) U.S. Cl. .............................. 342/27; 342/70; 342/82; 342/89; 342/94; 342/118; 342/134; 342/135; 342/137; 342/175; 342/195; 342/202

(58) Field of Classification Search ................... 342/27, 342/28, 59, 70–72, 118, 134–145, 175, 195, 342/200–205, 73–75, 80, 82–103, 128, 130–132, 342/165, 169–172; 375/130–153; 340/425.5, 340/426.1, 427, 426.24–426.34, 500, 540, 340/541, 551–563
See application file for complete search history.

(56) References Cited

U.S. PATENT DOCUMENTS 2,987,720 A * 6/1961 Katzin ......................... 342/137
3,452,353 A * 6/1969 Neuendorf ................... 342/170
3,631,487 A * 12/1971 Huntsinger et al. .......... 342/135
3,680,097 A * 7/1972 Huntsinger .................. 342/135
3,727,222 A * 4/1973 Hollis ........................... 342/80
3,739,379 A * 6/1973 Davis .......................... 342/137

(Continued)

FOREIGN PATENT DOCUMENTS

EP 0 213 558 11/1987

(Continued)

OTHER PUBLICATIONS

European Search Report for the corresponding EP Application EP 07 11 8876 mailed Apr. 22, 2008.

*Primary Examiner*—Bernarr E Gregory
(74) *Attorney, Agent, or Firm*—Frank A. MacKenzie; Brooks Kushman P.C.

(57) ABSTRACT

A method for presence detection using a microwave transmitter and a microwave receiver, the method including generating a sequence of clock pulses by means of a pulse generator, feeding the clock pulses to a clocked circuit arranged to generate a sequence of first pulses of a first pulse length and a sequence of second pulses of a second pulse length, each one of the first and second pulse lengths being related to a predetermined number of the clock pulses, periodically actuating the microwave transmitter by means of the sequence of first pulses, periodically actuating the microwave receiver by means of the sequence of second pulses; and determining whether an object is present in the detection volume based on microwave radiation being received by the microwave receiver. A system for such presence detection is also disclosed.

2 Claims, 2 Drawing Sheets

U.S. PATENT DOCUMENTS

| | | | | |
|---|---|---|---|---|
| 3,975,729 | A * | 8/1976 | Ringer | 342/82 |
| 4,049,953 | A * | 9/1977 | Evans, Jr. | 342/137 |
| 4,157,545 | A * | 6/1979 | O'Farrell | 342/145 |
| 4,303,920 | A * | 12/1981 | Mortimer | 342/202 |
| 4,450,445 | A * | 5/1984 | Conner et al. | 342/84 |
| 4,817,113 | A * | 3/1989 | Lundquist et al. | 375/141 |
| 4,851,852 | A * | 7/1989 | Bjorke et al. | 342/135 |
| 5,543,799 | A * | 8/1996 | Heger | 342/137 |
| 5,610,613 | A * | 3/1997 | Hazard et al. | 342/135 |
| 5,905,455 | A * | 5/1999 | Heger et al. | 342/142 |
| 6,137,438 | A * | 10/2000 | McEwan | 342/135 |
| 6,426,716 | B1 | 7/2002 | McEwan | |
| 6,535,161 | B1 * | 3/2003 | McEwan | 342/134 |
| 6,844,842 | B2 * | 1/2005 | Kroeger et al. | 342/70 |
| 6,879,281 | B2 * | 4/2005 | Gresham et al. | 342/70 |
| 7,196,629 | B2 * | 3/2007 | Ruoss et al. | 342/118 |
| 7,408,499 | B2 * | 8/2008 | Szajnowski | 342/70 |
| 2002/0158791 | A1 | 10/2002 | Meier | |
| 2003/0193430 | A1 * | 10/2003 | Gresham et al. | 342/70 |
| 2004/0004567 | A1 * | 1/2004 | Kroeger et al. | 342/137 |
| 2005/0073424 | A1 | 4/2005 | Ruoss et al. | |
| 2006/0244653 | A1 * | 11/2006 | Szajnowski | 342/70 |

FOREIGN PATENT DOCUMENTS

| | | | |
|---|---|---|---|
| GB | 2134741 | A * | 8/1984 |
| GB | 2 421 650 | | 6/2006 |

* cited by examiner

METHOD AND SYSTEM FOR PRESENCE DETECTION

CROSS-REFERENCE TO RELATED APPLICATION

This application claims foreign priority benefits under 35 U.S.C. §119(a)-(d) to EP 07118876.7.9.0 filed Oct. 19, 2007, which is hereby incorporated by reference in its entirety.

BACKGROUND

1. Technical Field

The present invention relates to a method and system for presence detection within a predetermined detection volume using an arrangement for transmitting and receiving microwave radiation.

2. Background Art

Systems for detection of the presence humans, animals, and other objects in a defined area or space are well-known and are commonly used, for example as intrusion detection systems. With regard to vehicles, for example, it is common today to use intrusion detectors in order to provide an alarm in the event that the presence of a human or an animal is detected within the passenger compartment of the vehicle.

A system for presence detection in a vehicle may comprise a combined radio transmitter and receiver based on microwave technology, which means that the radio transmitter is arranged for emitting microwave radiation into a space corresponding to the vehicle's passenger compartment. Furthermore, the receiver is arranged for detecting any microwave radiation which is reflected as a result of humans, animals, or other moving objects being present in the space. In order to achieve this, it is previously known to use microwave-based detection units of the so-called Doppler motion sensor type. Such units are based on the Doppler shift phenomenon in order to detect motion of objects in a space.

U.S. Pat. No. 6,426,716 teaches a motion sensor based on a microwave transceiver apparatus. Furthermore, patent document EP 213558 teaches an intrusion detection device based on microwave technology, wherein an oscillator which is used to generate microwave radiation also is used as a detector.

In the field of intrusion detection, it is sometimes important that intrusion only be detected in a very well-defined space, i.e. corresponding to a well-defined distance from the detector. This means that the components used, in particular the microwave transmitter and receiver, must be very accurate and of high quality so that the detection volume can be defined in an exact manner within the vehicle. Otherwise, there will be a risk for false alarms if for example a person or animal passes just outside of the detection volume. Consequently, there is a demand for improved systems arranged for precisely regulating the detection boundaries around an intrusion detector—which means that false alarms can be minimized or preferably eliminated—while still using components and circuit solutions at a relatively low cost.

SUMMARY

A first aspect of the present invention provides a method of presence detection within a predetermined detection volume using a microwave transmitter and a microwave receiver. The method comprising generating a sequence of clock pulses with a pulse generator, feeding the clock pulses to a clocked circuit arranged to generate a sequence of first pulses of a predetermined first pulse length and a sequence of second pulses of a predetermined second pulse length. Each one of the first and second pulse lengths are related to a predetermined number of the clock pulses. The microwave transmitter is periodically actuated with the sequence of first pulses, and the microwave receiver is periodically actuated with the sequence of second pulses, and presence of an object in the detection volume is based on microwave radiation received by the microwave receiver.

A second aspect of the present invention provides a system for presence detection within a predetermined detection volume. The system comprises a pulse generator for generating a sequence of clock pulses, a clocked circuit receiving the sequence of clock pulses and generating a sequence of first pulses of a predetermined first pulse length and a sequence of second pulses of a predetermined second pulse length, the first and second pulse lengths being related to a predetermined number of clock pulses, means for periodically actuating a microwave transmitter, and a microwave receiver for detecting microwave radiation within the detection volume and determining whether an object is present in the detection volume based on the microwave radiation being received.

The invention provides an intrusion detector with sharply defined boundaries of the detection volume around the sensor. The boundaries of the detection sphere can be precisely controlled by means of the above-mentioned digital clocked circuit, which is arranged to generate output pulses to control the microwave transmitter and receiver, respectively. In this manner, detection can be avoided outside the detection sphere. This drastically reduces the influence by objects, moving or not, outside the detection boundaries, which are often the cause of false alarms.

The invention is suitably intended to be used with an intrusion detector of the type which is based on the Doppler effect on transmitted microwave radiation.

BRIEF DESCRIPTION OF THE DRAWINGS

The invention will now be described in more detail with reference to a preferred exemplary embodiment and to the attached drawings, in which.

DETAILED DESCRIPTION OF EMBODIMENTS OF THE INVENTION

Figure 1:
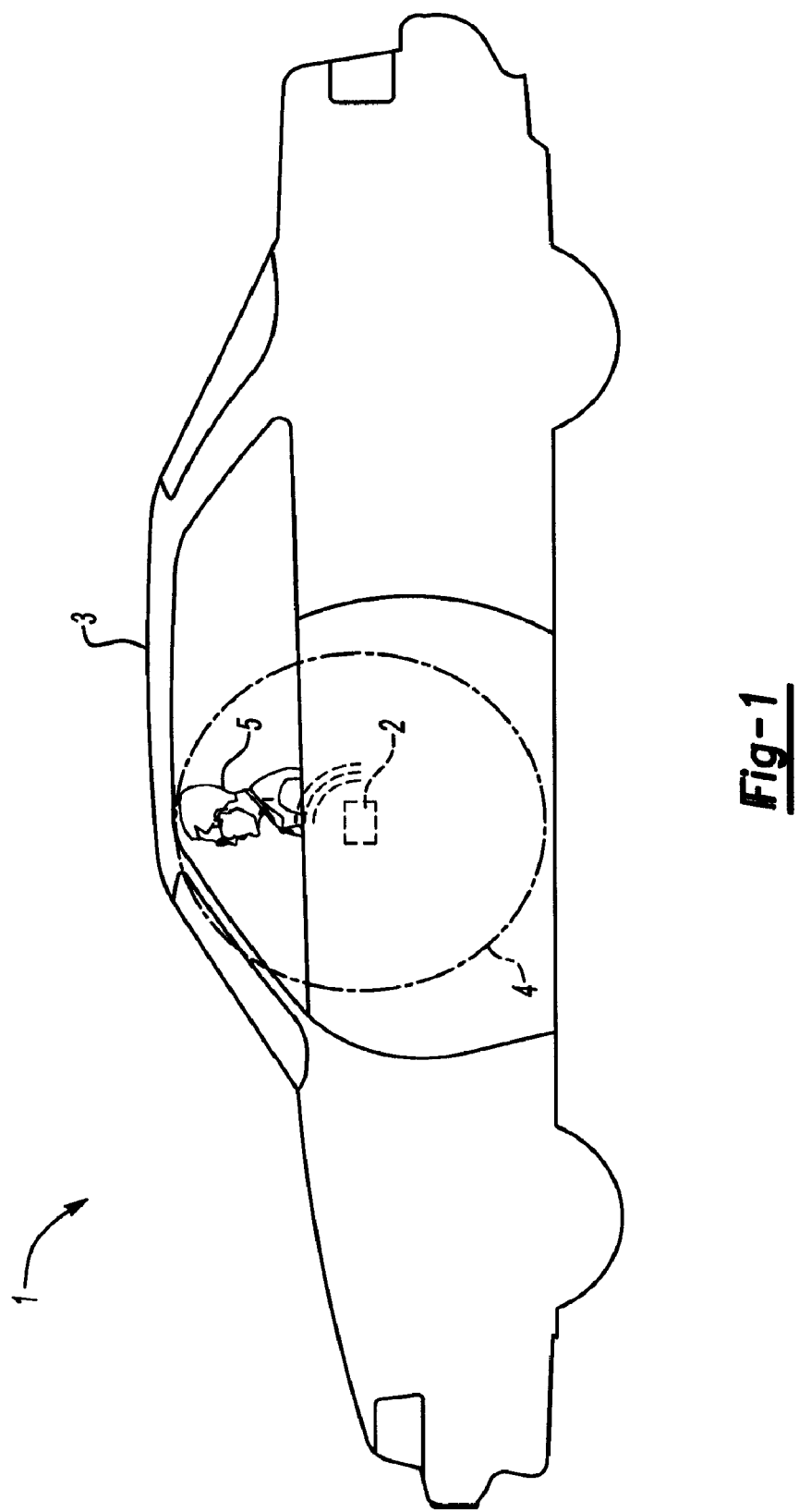
FIG. 1 is a schematic drawing of a vehicle equipped with a system in accordance with an embodiment of the present invention.

With reference to FIG. 1, there is shown a simplified schematic drawing of a part of a vehicle 1 which is equipped with a system for presence detection according to an embodiment of the present invention. More precisely, FIG. 1 shows a mid section of a conventional passenger car 1. As shown in a schematic manner, the car 1 is provided with a transmitter and receiver unit 2 for presence detection which is preferably positioned in a central part of the car's 1 passenger compartment 3. More precisely, the transmitter and receiver unit 2 is preferably located between the two front seats (not shown) of the vehicle, for example in a console which is mounted to the floor of the car 1.

As will be described in greater detail below, the transmitter and receiver unit 2 comprises a microwave transmitter which is arranged for transmitting microwave radiation into the passenger compartment 3. As illustrated in FIG. 1, the microwave radiation is emitted into a predetermined presence detection volume 4, i.e. a spherical "bubble" having dimensions and being positioned so as to correspond to a predetermined part of the passenger compartment of the car 1 in which the presence of a living human person (or animal) is to be detected. Such a person is illustrated in a simplified manner by means of reference numeral 5 in FIG. 1. To achieve such detection, the transmitter and receiver unit 2 is arranged in a manner which now will be described in detail with reference to FIGS. 2 and 3.

Figure 2:
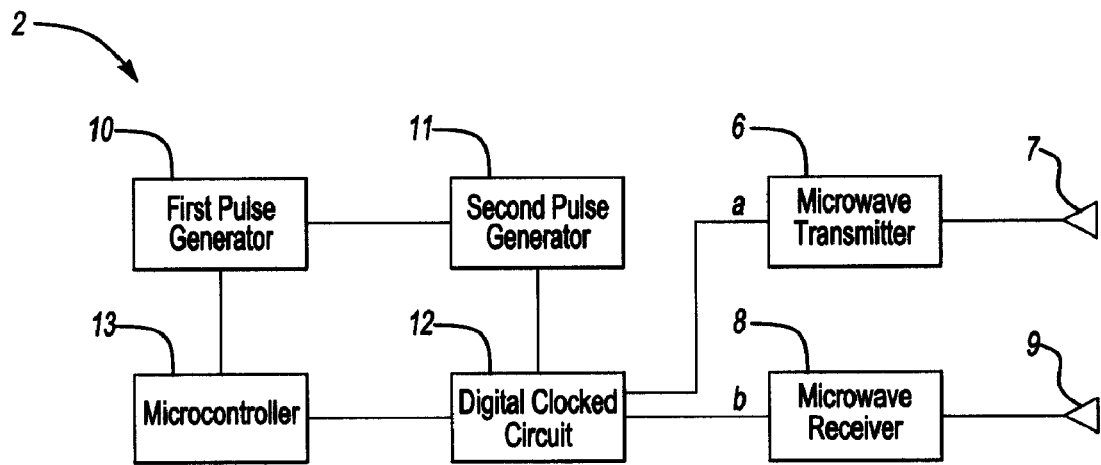
FIG. 2 is a schematic block diagram showing the design of an arrangement in accordance with an embodiment of the invention.

FIG. 2 is a schematic diagram of the transmitter and receiver unit 2, which comprises a microwave transmitter 6 and an associated transmitter antenna 7. The unit 2 also comprises a microwave receiver 8 and an associated receiver antenna 9.

The microwave transmitter 6 is arranged for feeding the transmitter antenna 7 so as to emit radiation generally in the microwave range. The operation of a microwave transmitter and receiver for the purpose of presence detection in a given zone or sphere is known as such, and for this reason it is not described in detail here. A previously used microwave-based detection unit suitable for this invention is based on the so-called Doppler motion sensor type.

In a manner which will be described in greater detail below, the microwave transmitter 6 is arranged to be pulsed on-off in order to produce short bursts of microwave energy to be transmitted into the detection volume 4. The microwave receiver 8 is also pulsed on-off to receive microwave radiation reflected from an intrusion object such as the person 5 shown in FIG. 1. This means that the microwave transmitter 6 is in an active transmitting state during a certain time period and that the microwave receiver 8 is in an active receiving state of operation during a certain time period which is adapted in a suitable manner with respect to the active state of the microwave transmitter 6.

The transmitter and receiver unit 2 comprises a first pulse generator 10, preferably operating at a relatively low pulse repetition frequency, which is arranged for producing a sequence of pulses which are fed to (so as to enable) a second pulse generator 11, operating at a relatively high pulse repetition frequency. In this manner, the second pulse generator 11 can be enabled in a periodical manner as controlled by the first pulse generator 10.

The second pulse generator 11 preferably operates in the microwave range. This means that its frequency may be derived from a microwave oscillator. However, the invention is not limited to such a frequency range but can be implemented with a second pulse generator 11 operating in another frequency range.

The output of the second pulse generator 11 is connected to a digital clocked circuit 12, which is clocked by the second pulse generator 11, preferably by means of high frequency pulses. The digital clocked circuit 12 may be based on digital circuits such as flip-flops, modulo-counter/dividers, frequency dividers, shift registers or other suitable clocked digital circuits (or any combinations of such circuits). According to the embodiment, the second pulse generator 11 defines a time base for controlling the operation of the digital clocked circuit 12. More precisely, the digital clocked circuit 12 is controlled so as to generate a sequence of first output pulse signals a and a sequence of second output pulse signals b as indicated schematically in FIG. 2. The first output pulse signals a are fed to the microwave transmitter 6 and constitute "transmit enable" pulses for the microwave transmitter 6.

Furthermore, the second output pulse signals b are fed to the microwave receiver 8 and constitute "receive enable" pulses for the microwave receiver 8.

Since the second pulse generator 11 is a high frequency oscillator, it can be expected that it consumes a relatively high amount of electrical power. The digital clocked circuit 12 can also be assumed to consume a relatively high amount of electrical power. For this reason, the second pulse generator 11 and the digital clocked circuit 12 are enabled and disabled by the first pulse generator 10 as described. In this manner, a reduced average power consumption is achieved, since the active duty cycle of the second pulse generator 11 could typically be a fraction of 1 percent.

The purpose of the digital clocked circuit 12 is to produce pulses (i.e. the first and second output pulses a, b) with a predetermined and exact duration, referred to herein as pulse length. This is achieved by a correlation between the length (or duration) of each output pulse a, b and a respective corresponding number of clock pulses from the digital clocked circuit 12. This correlation may optionally be controlled at any moment by means of a microcontroller 13 which is used to configure the digital clocked circuit 12 for different detection ranges. To this end, an output of the microcontroller 13 is connected to the digital clocked circuit 12, as shown in FIG. 2. This connection constitutes a configuration input by means of which the microcontroller 13 is used to adapt the operation of the digital clocked circuit 12 to different ranges of detection, i.e. different sizes of the detection sphere 4, depending on the actual vehicle in which the invention is used.

Consequently, each output pulse signal a, b from the digital clocked circuit 12 is independently configurable by means of the microcontroller 13, by the configuration input which is constituted by the connection between the microcontroller 13 and the digital clocked circuit 12. The length of each one of the output pulses a, b is configurable to a fixed or variable value. This means that the length of each one of the pulse signals a, b can be chosen in the form of a number of clock pulses being fed to the clocked digital circuit 12 depending on which vehicle type the intrusion detector is fitted to, and may be changed at any moment in one vehicle type to achieve different levels of detection. This allows for a generic configurable intrusion detector suitable for differently sized vehicles.

Furthermore, it can be noted regarding the output pulses a, b, that the first output pulse a (or more precisely, each of the first output pulse signals a) is active during a first time period in which the microwave transmitter 6 is enabled and microwave radiation is emitted into the detection volume 4. A certain time after enabling the microwave transmitter 6, it can be expected that any microwave radiation which is reflected by the person 5 will reach the receiver antenna 7. According to the embodiment shown, the second output pulse b (or more precisely, each of the second output pulse signals b) will be generated at a proper time so that such reflected radiation can be detected by means of the receiver microwave antenna 9 and the microwave receiver 8, i.e. so that the microwave receiver 8 is enabled during a time when such reflected radiation is expected to reach the receiver antenna 9. In this manner, it will be possible to detect any occurring presence in the detection volume 4. Normally, the enablement of the microwave receiver 8 should take place with a slight delay as compared with the enablement of the microwave transmitter 6.

Figure 3:
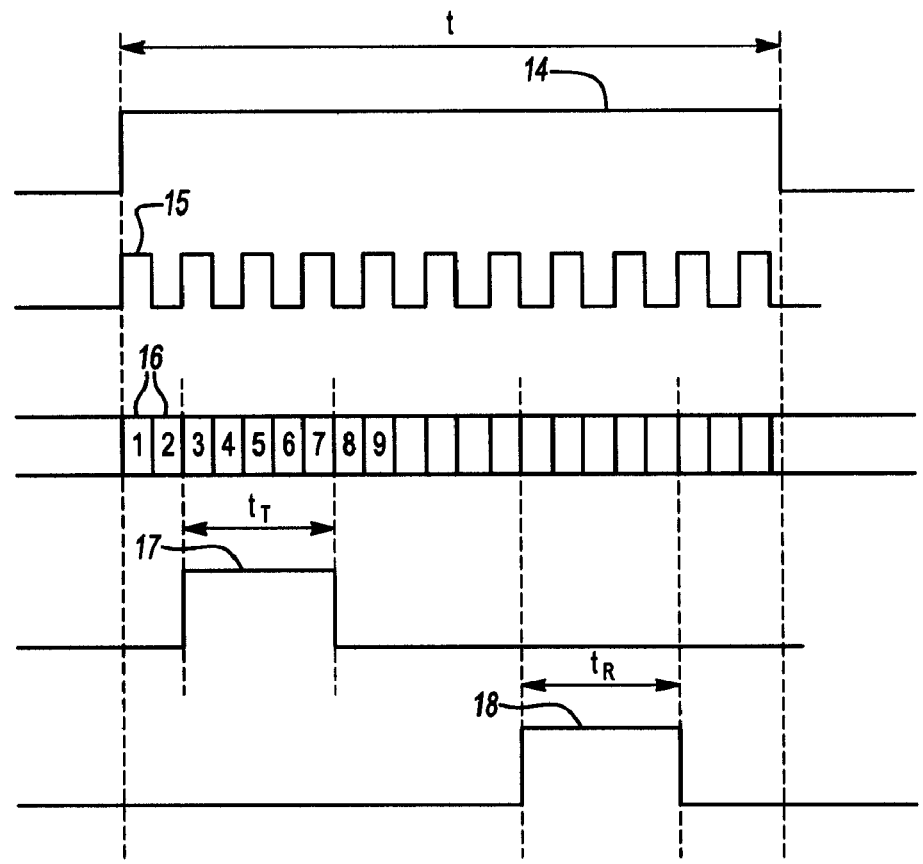
FIG. 3 is a diagram showing a sequence of timing pulses in order to illustrate an embodiment of the invention.

FIG. 3 shows an example of a pulse timing diagram for the implementation of the invention according to the embodiment shown in FIGS. 1 and 2. A first pulse, indicated by reference numeral 14, corresponds to the pulse output from the first pulse generator 10 (cf. FIG. 2). The pulse 14 is shown as having an active state, i.e. an "enabled" state, during a predetermined time period t.

As a result of the output pulse 14 from the first pulse generator 10 being active, a sequence of clock pulses 15 is generated by the second pulse generator 11 and is fed to the digital clocked circuit 12. This sequence of pulses 15 generates a number of consecutive states 16 at the output of the digital clocked circuit 12. In FIG. 3, the first nine of these states 16 are numbered (1, 2, 3 . . . etc.).

As mentioned above, it is desired to enable the microwave transmitter 6 during a certain time period and enable the microwave receiver 8 during a further time period. Furthermore, it is preferable for the microwave receiver 8 to be enabled slightly later than the microwave transmitter 6, so as to allow for reflected microwave radiation to reach the microwave receiver 8 after having been transmitted out into the detection volume 4. To this end, the first output pulse a from the digital clocked circuit 12 is correlated, for example, to the digital clocked circuit's states number 3 through 7, and the second output pulse b is correlated, for example, to the digital clocked circuit's states number 14 through 18. The actual states which are chosen can of course vary depending on in which vehicle the invention is used, or on other criteria. The embodiment described here and shown in FIG. 3 is just an example.

In any case, a transmit enable pulse 17 is generated during which the microwave transmitter 6 is active. The transmit enable pulse 17 has a predetermined length $t_T$ which is the time which elapses during the states 3 through 7. Also, a receive enable pulse 18 is generated during which the microwave receiver 8 is active. The receive enable pulse 18 has a predetermined length $t_R$ which is the time which elapses during the states 14 through 18. Alternatively, the pulse transmit enable pulse 17 and the receive enable pulse 18 may overlap, i.e. meaning that the receive enable 18 may enter its active state before the transmit enable pulse 17 enters its inactive state.

The specific ranges of states 16 during which the output pulses a, b are active are determined and controlled by means of the microcontroller 13, which is connected via a configuration input to the digital clocked circuit 12 as mentioned above. The length between the actuation of the first output pulse a and the actuation of the second output pulse b preferably corresponds to a time gap for the emitted microwave radiation to reach the outer edge or perimeter of the detection sphere 4 and to return to the microwave receiver 8 if reflected.

When the microwave receiver 8 is active, microwave radiation is received by the receiver 8. The receiver 8 is connected to a detection circuit (not shown) which is arranged for determining whether presence is to be detected. As mentioned above, such detection is previously known as such, and could be of the Doppler shift type which is arranged for deciding whether there is any presence in the detection volume 4 based on the received microwave radiation.

The physical wavelength of the second pulse generator 11 may be determined by its equivalent frequency. If the second pulse generator 11 is a microwave oscillator operating at, for example, 6 GHz, the wavelength is 50 millimeters. The digital clocked circuit 12 may be clocked on any edge, positive or negative. Therefore, since the second pulse generator 11 clocks the digital clocked circuit 12, and if its duty cycle is 50%, this means that the range control system is configurable by a physical resolution of half that wavelength, i.e. 25 millimeters. This means that the radius of the detection volume 4, see FIG. 1, around the intrusion detector is configurable in steps of 25 millimeters.

Furthermore, the duration of the transmitter-on interval determines how far from the detector that detection is possible. The duration and position of the receiver-on interval in relation to the transmitter-on interval also determine the near detection interval. Having the ability to precisely set the transmitter and receiver on-off signals enables a very precise control of the outer and near detection boundaries, i.e. the radius of the detection volume 4.

The entire transmitter and receiver unit 2 with its parts, the first pulse generator 10, the second pulse generator 11 and the digital clocked circuit 12, may be realized in a function programmable gate array (FPGA), an application specific integrated circuit (ASIC) or by means of other types of hybrid technology where analog and digital circuits are highly integrated. Also, the microcontroller 13 may be a separate component or may also be integrated in the same technology. Also, the first pulse generator 10 may be included within the microcontroller 13. This enables a physically small intrusion detector with relatively few components on a printed circuit board (PCB).

The invention enables the use of digital circuits clocked by a frequency generator or oscillator. The accuracy of the output pulse length, and hence detection range, is directly proportional to frequency accuracy. This relationship, since it is due to the nature of digital circuits, is constant and non-degrading over the components' lifetime. Therefore, the only variable in the system is the oscillator frequency. If the frequency is kept accurate over time, which is possible in the context of the invention, the system will have an accurate detection range over the components' lifetime. Without this ability, good precision would have to be obtained by the use of precision analog components, calibration procedures, or feedback control systems, which would add cost.

The invention is not limited to the embodiment described above, but may be modified without departing from the scope of the claims below. For example, the invention can be used in different types of vehicles, for example load-carrying trucks, buses, boats and other types of vehicles and vessels.

The invention can be used for intrusion detection for vehicles such as cars and trucks or generally any type of defined space or zone, i.e. a detection sphere. Also, the invention can be used for indoor and outdoor alarms, industrial robot control, home automation control, detection for actuating light when someone enters a room, automatic door openers and other applications in which there is a need for reliable and cost-effective detection of the presence of a human or animal in a detection sphere.

In principle, more than one digital clocked circuit can be used. For example, separate digital clocked circuits for the microwave transmitter 6 and the microwave receiver 8 can be used. In this manner, the microwave transmitter 6 and the microwave receiver 8 are controlled independently from each other.

What is claimed:
1. A system for presence detection comprising:
a first pulse generator producing a first pulse sequence having a first pulse repetition frequency;
a second pulse generator enabled by the first pulse sequence to produce a second pulse sequence having a second pulse repetition frequency higher than the first pulse repetition frequency;
a clocked circuit enabled by the second pulse sequence to generate a sequence of transmit enable pulses and a sequence of receive enable pulses, the transmit enable pulses having a first pulse length defined by a first number of pulses in the second pulse sequence and the receive enable pulses having a second pulse length defined by a second number of pulses in the second pulse sequence;

a transmitter receiving the transmit enable pulses and actuated thereby to enter an active transmit state wherein the transmitter transmits microwave radiation; and a receiver actuated by the receive enable pulses to enter an active receive mode wherein the receiver detects the microwave radiation within transmitted by the transmitter, the receiver operable to determine whether an object is present in a detection volume based on the microwave radiation being received.

2. The system according to claim 1 further comprising a microcontroller controlling the clocked circuit by determining a relation between the number of clock pulses fed to the clocked circuit and the first and second pulse lengths.

* * * * *